Oct. 13, 1925.
C. E. BEACH
SIGNALING SYSTEM
Filed Jan. 7, 1920
1,557,404
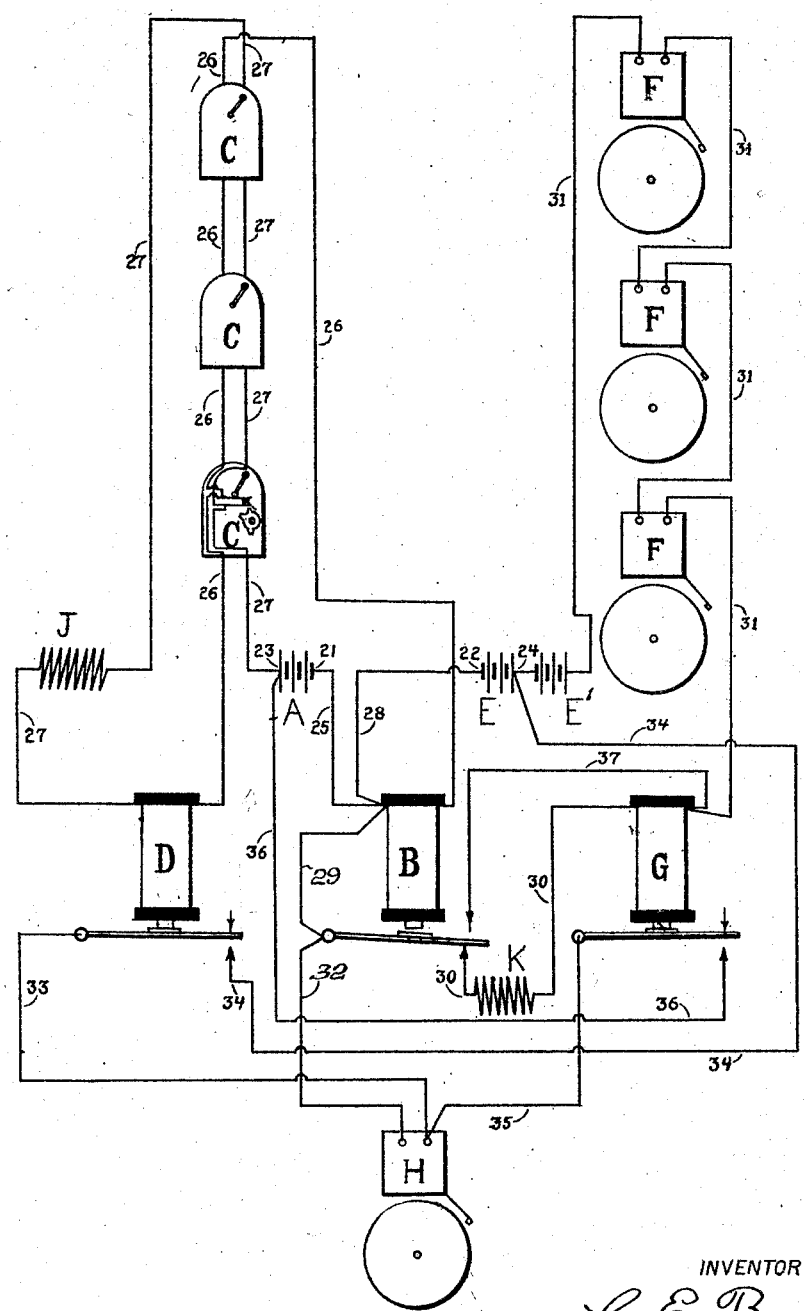
INVENTOR
C. E. Beach Patented Oct. 13, 1925.

1,557,404

UNITED STATES PATENT OFFICE.

CLARENCE E. BEACH, OF BINGHAMTON, NEW YORK, ASSIGNOR TO THE GAMEWELL COMPANY, OF NEWTON, MASSACHUSETTS, A CORPORATION OF MASSACHUSETTS.

SIGNALING SYSTEM.

Application filed January 7, 1920. Serial No. 349,948.

*To all whom it may concern:*

Be it known that I, CLARENCE E. BEACH, a citizen of the United States, residing at Binghamton, county of Broome, and State of New York, have invented certain new and useful Improvements in Signaling Systems, of which the following is a specification.

This invention relates to signaling systems comprising two or more current sources, and comprising facilities for maintaining a constant test of the effectiveness of each of said sources and for giving a desired warning in the event of substantial impairment thereof. Certain features of this invention are particularly adapted for use in signaling systems comprising two circuits, one of which circuits includes signal transmitting stations and the other of which circuits includes signal receiving stations, each of said circuits having a current source independent of the other, and warning means being provided which comprises, for example, a conventional "trouble bell", to act continuously to direct attention to impairment or failure of either current source, the normal so-called "supervisory" or "test" current employed in such circuits being substantially less than the current impulses incident to the transmission of signals.

An object of this invention is to provide a signaling system in which two or more independent current sources, each of which is under constant test, will be reciprocally employed to operate a warning signal.

Another object of this invention is to provide a signaling system comprising a transmitting device circuit and a receiving device circuit, having independent current sources for said circuits, arranged to maintain said sources and the current paths of said circuits under constant electrical test at a current value substantially less than that utilized for signaling impulses, and having a warning signal operable by either of said sources in the event of more than a predetermined degree of impairment in or complete interruption of current flow from the other of said sources, respectively.

Other objects are to simplify such systems, to render them more durable and more reliable in operation, and to decrease the costs of their installation and maintenance.

Still other objects together with their inherent advantages will be in part obvious and in part hereinafter specifically set forth.

In constructing this invention,—independent current sources are provided, and testing mechanism is connected to said sources to act, whenever the output of any one of said sources develops certain predetermined characteristics, to render effective a connection between another of said sources and suitable warning means.

To the end that duplication of manifesting mechanisms may be avoided,—a like terminal of each of several current sources is connected to one terminal of a single warning device, testing mechanism being arranged to act, in response to the development of more than a predetermined degree of impairment in or interruption of current flow from any one of such sources, to connect the opposite terminal of another one of such current sources to the other terminal of said device.

In applying this invention to systems in which current impulses incident to the transmission of signals are substantially greater than the normal test current flow through the transmitting device and the receiving device circuits,—testing mechanism (such as, for example, relatively high resistance relays) is connected in each of said circuits, such mechanism being so adjusted as to act to close a suitable set of contacts whenever the current flow in any one of said circuits is less than a predetermined standard: and repeating mechanism (such as, for example, a relatively low resistance relay) is connected in a portion of the transmitting device circuit which is subjected to the increased current flow incident to signaling impulses formulated by any of the transmitting stations in said circuit, so that said repeating mechanism will be responsive to such impulses; and said repeating device is connected in the receiving device circuit so as to exclude therefrom the receiving device circuit testing mechanism whenever said repeating mechanism is subjected to an alarm impulse of the transmitting device circuit, and to include the testing mechanism of said receiving device circuit therein at other times. A terminal of the current source of the transmitting device circuit is connected to a like terminal of the current source of the receiving device circuit and to a terminal of an emergency warning device, the other terminal of said device being connected to one of the contacts of each of the sets of contacts operable by the testing mechanism. Another contact of the set responsive to the transmitting circuit is connected to the remaining terminal of the receiving device circuit current supply, one of the contacts of the set responsive to the receiving device circuit being correspondingly connected to the transmitting device circuit current supply.

For the purpose of enabling this invention to be more readily understood, an embodiment thereof is shown in the accompanying drawing and hereinafter described; but this invention is not limited to the particular embodiment therein shown and hereinafter described, as many changes may be made, and parts may be added or omitted, without departing from the spirit and scope of this invention.

Referring to the accompanying drawing, in which like reference characters denote similar parts: the signaling system shown comprises a transmitting device circuit having a current source A, including the winding of a repeating relay B, connecting in parallel the transmitting stations C, C, C, and closed at its far end through the testing relay D; together with a receiving device circuit having a current source E, serially including the receiving devices F, F, F, and alternate current paths controlled by the armature of relay B, the back stop of said armature establishing a current path through the winding of the receiving device test relay G, and the front stop of said armature establishing a current path through said circuit exclusive of the testing relay G.

The current sources A and E are represented as batteries, the terminal 21 of battery A and the terminal 22 of battery E being of the same polarity, and said terminals being connected in common to one end of the winding of relay B, to the armature of said relay, and to one terminal of the emergency warning device or trouble bell H.

For convenience, the terminals 21 and 22 of the respective batteries A and E, which are connected in common, as just described, will be hereinafter referred to as "common terminals", and the remaining terminals 23 and 24 of said respective batteries will be referred to as "non-common" terminals.

Batteries A and E should be of substantially equivalent electromotive force so that, in the event of said batteries being connected together in parallel relation, under circumstances which will be hereinafter more fully described, there will be no substantial or maintained reverse current flow in either battery.

If substantially equal numbers of similar cells are provided in batteries A and E, it will be found that, for reasons which are well understood by those skilled in the use of such batteries, regardless of whether primary or secondary cells are employed, no objectionable reverse current flow will result from the connection of these batteries in parallel to the terminals of the trouble bell H and to the transmitting and receiving device circuits, even if the cells of one of said batteries suffer deterioration which substantially decreases the discharge voltage of such cells.

The potential of the current source of the transmitting device circuit should be such as will cause a desired current flow in such circuit whenever the relay D is short-circuited (as by one of the transmitting stations C, C, C) so as to provide a suitable factor of safety in causing effective energization of the winding of relay B. The current source for the receiving device circuit should develop such electromotive force as will cause current flow through the receiving device circuit (exclusive of the winding of relay G) sufficient to effectively energize, with a suitable factor of safety, the magnet windings of the receiving devices F, F, F. Should it be found that the electromotive force required for one of the circuits is substantially different from that required for the other circuit, a supplemental battery, such as the battery E' shown connected in the receiving device circuit, may be provided in one circuit or the other, so as to afford the desired electromotive force for the operation thereof; but in any event the portions of the current sources connected between terminals 21 and 23 and between terminals 22 and 24 of such respective circuits should be of approximately equivalent electromotive force.

The relay B should be arranged to be unresponsive to the normal test current flow in the transmitting device circuit, but should, as hereinbefore pointed out, be suitably responsive to the current flow in this circuit when the test relay D is short-circuited by any one of the transmitting stations C, C, C.

The winding of relay D should be of such resistance that, when included in the current path of the transmitting device circuit, the normal electromotive force of the battery A will provide a test current of the desired strength therein; the resistor J being connected in series with the winding of the relay D in the event of its being found inconvenient to provide sufficient resistance in said winding.

The relay D is so adjusted that the armature of said relay will be picked up and held in attracted position during current flow, through the winding of said relay, such as will result from the application of the normal electromotive force of the transmitting device circuit current source to said relay through the normal current path of said circuit; and, to permit the armature of said relay to drop to retracted position, in response to substantial decrease in the factor of safety in the electromotive force of said source.

The resistance of the winding of relay G—supplemental, if need be, by the resistor K—should be such that, when the current path of the receiving device circuit includes such resistance, the current flow in said circuit will be insufficient to cause effective energization of the magnets of the receiving devices F, F, F; and the relay G should be adjusted with relation to the normal electromotive force of the current source for the receiving device circuit in a manner corresponding to that hereinbefore described for relay D.

The trouble bell H should be suited for operation by the current sources A and E (acting either independently or in parallel) either at the maximum electromotive force of said sources or at lower electromotive forces such as are deemed likely to develop, incident to the deterioration of either source, during the sounding of the bell within a comparatively short time after the electromotive force of either current source has decreased to a point which should cause the trouble bell to sound.

The operation of the system is as follows: When the system is at rest the normal test current paths are effective, and the relay B is not effectively energized, the relays D and G are effectively energized, and there is no current flow through the trouble bell H. The normal test current path of the transmitting device circuit is as follows: from terminal 21 of battery A through conductor 25 to one end of the winding of relay B, thence through winding of said relay and through conductor 26 to one end of the winding of relay D, thence through the winding of said relay (and resistor J, if used) and through conductor 27 to the terminal 23 of source A. The normal test current path of the receiving device circuit extends from terminal 22 of battery E, through conductor 28 to junction with conductors 25 and 29 at one end of the winding of relay B, thence through conductor 29 to armature of relay B, through said armature to the back stop thereof, thence through conductor 30 (and resistor K, if used) to one end of the winding of relay G, thence through said winding, through conductor 31, and through the magnet windings of receiving devices F, F, F serially connected in said conductor (and through supplemental current source E', if used) to terminal 24 of battery E.

From the foregoing it is evident that in the event of a break in either of the normal test current paths just described, the magnet of the test relay included in such path will be de-energized, and the armature of such relay will thereupon move to retracted position. It is also evident that in the event of dangerous decrease in the electromotive force of the current source of either circuit, the armature of the test relay of such circuit will likewise move to retracted position.

Should the armature of relay D move to retracted position, the trouble bell will sound because of the establishment of a current path as follows: from terminal 22 of battery E through conductors 28 and 29 to the armature of relay B, thence through conductor 32 to one terminal of trouble bell H, thence from the other terminal of said bell, through conductor 33 to armature of relay D, through said armature and the back stop thereof to conductor 34, and through conductor 34 to terminal 24 of the battery E.

Should the armature of relay G move to retracted position, the trouble bell will sound because of the establishment of a current path as follows: from terminal 21 of battery A, through conductors 25, 29 and 32 to one terminal of trouble bell H, from the other terminal of said bell, through conductor 35 to the armature of relay G, through said armature and its back stop, and through conductor 36 to terminal 23 of battery A.

From the foregoing it will be apparent that the batteries A and E are reciprocally employed for the operation of the trouble bell H,—the battery A being employed in response to impairments of the battery E, and the battery E being employed in response to impairments of the battery A.

Should any one of the transmitting stations C, C, C be operated, a connection will be alternately closed and opened between the conductors 26 and 27 so as to formulate the desired code signal in a well-known manner. During each such closure the winding of the relay D (and the resistor J, if used) will be short-circuited, thereby permitting the armature of said relay to move to retracted position, and the magnet of relay B will be effectively energized, thereby causing the armature of said relay to move to attracted position. Such movement of the armature of relay B will break the normal current path through conductor 30 (also through resistor K, if used) and relay G, permitting the armature of said relay to move to retracted position and will close a current path through conductor 37, between conductor 31 and the armature of said relay B, thereby permitting sufficient current flow through the windings of the magnets of receiving devices F, F, F to cause effective energization thereof.

From the foregoing it is apparent that, during connections between conductors 26 and 27, such as may be established by any of the transmitting stations C, C, C, the batteries A and E, acting in parallel, will be applied to the terminals of the trouble bell H, through the respective current paths already described.

When devices employed in the receiving circuit require the application of comparatively heavy currents for substantial periods of time (as, for example, when low resistance horns or vibrating bells are employed),—battery conditions may develop as a result of which the electromotive force of the current source of said circuit would decrease very rapidly during signaling closures, although such force would disclose little change during normal test current flow, and such conditions may therefore cause serious impairment of the receiving circuit manifestations unless a suitable force is so applied as to supplement that of the receiving circuit current source.

The use of this invention, either with or without a warning means, will overcome these battery conditions, as the action of relays D and G, during signaling closures, connects batteries A and E in parallel, and the capacity of battery A is therefore available to supplement that of battery E, for the continuously effective energization of the receiving device circuit.

Having fully described this invention what I claim and desire to secure by Letters Patent of the United States is:

1. A signal system comprising repeating mechanism including circuit controlling means and electromagnetic mechanism unresponsive to current flow of less than a certain predetermined intensity and arranged to cause functional actuation of said controlling means in response to current flow of greater intensity; a transmitting circuit including said electromagnetic mechanism, a current source, a relay arranged for effective energization in response to current flow in said circuit of less than the aforesaid predetermined intensity, and transmitting stations arranged to formulate signaling impulses in said circuit by abnormal conditioning thereof to terminate effective energization of said relay, said circuit of such resistance so arranged that the current flow normally induced by said current source will be only sufficient to assure effective energization of said relay and so that the current flow during the aforesaid abnormal conditioning of said circuit will cause functional actuation of the controlling means of said repeating mechanism; a receiving circuit including a current source, receiving devices unresponsive to current flow of less than a certain predetermined intensity and arranged for functional actuation in response to current flow in said receiving circuit of greater intensity, a relay arranged for effective energization in response to current flow in said receiving circuit of less intensity than that required for the functional actuation of said receiving devices, said receiving circuit so connected to the circuit controlling means of said repeating mechanism and of such resistance and so arranged that, when said circuit controlling means is in functionally actuated condition, said second named relay will not be effectively energized and the intensity of the current flow through said receiving devices will be sufficient to cause response thereof, and, when said circuit controlling means is not in functionally actuated condition, the current flow induced by said second named current source will be only sufficient to assure effective energization of said second named relay; and interconnections between the respective current sources and relays of said circuits whereby deenergization of said relays will effect parallel connection of said sources for the supply of said circuits.

2. A signal system comprising repeating mechanism including circuit controlling means and electromagnetic mechanism unresponsive to current flow of less than a certain predetermined intensity and arranged to cause functional actuation of said controlling means in response to current flow of greater intensity; a transmitting circuit including said electromagnetic mechanism, a current source, a relay arranged for effective energization in response to current flow in said circuit of less than the aforesaid predetermined intensity, and transmitting stations arranged to formulate signaling impulses in said circuit by abnormal conditioning thereof to terminate effective energization of said relay, said circuit of such resistance so arranged that the current flow normally induced by said current source will be only sufficient to assure effective energization of said relay and so that the current flow during the aforesaid abnormal conditioning of said circuit will cause functional actuation of the controlling means of said repeating mechanism; a receiving circuit including a current source, receiving devices unresponsive to current flow of less than a certain predetermined intensity and arranged for functional actuation in response to current flow in said receiving circuit of greater intensity, a relay arranged for effective energization in response to current flow in said receiving circuit of less intensity than that required for the functional actuation of said receiving devices, said receiving circuit so connected to the circuit controlling means of said repeating mechanism and of such resistance and so arranged that, when said circuit controlling means is in functionally actuated condition, said second named relay will not be effectively energized and the intensity of the current flow through said receiving devices will be sufficient to cause response thereof, and, when said circuit controlling means is not in functionally actuated condition, the current flow induced by said second named current source will be only sufficient to assure effective energization of said second named relay; interconnections between the respective current sources and relays of said circuits whereby deenergization of said relays will effect parallel connection of said sources for the supply of said circuits; and a warning device so associated with said interconnections that the energy of the sources may be reciprocally applied to said device.

3. A signal system comprising repeating mechanism including circuit controlling means and electromagnetic mechanism unresponsive to current flow of less than a certain predetermined intensity and arranged to cause functional actuation of said controlling means in response to current flow of greater intensity; a transmitting circuit including said electromagnetic mechanism, a current source, a relay arranged for effective energization in response to current flow in said circuit of less than the aforesaid predetermined intensity, and so arranged that the current flow normally induced by said current source will be only sufficient to assure effective energization of said relay and so that the current flow during the aforesaid abnormal conditioning of said circuit will cause functional actuation of the controlling means of said repeating mechanism; a receiving circuit including a current source, receiving devices unresponsive to current flow of less than a certain predetermined intensity and arranged for functional actuation in response to current flow in said receiving circuit of greater intensity, a relay arranged for effective energization in response to current flow in said receiving circuit of less intensity than that required for the functional actuation of said receiving devices, said receiving circuit so connected to the circuit controlling means of said repeating mechanism and of such resistance and so arranged that, when said circuit controlling means is in functionally actuated condition, said second named relay will not be effectively energized and the intensity of the current flow through said receiving devices will be sufficient to cause response thereof, and, when said circuit controlling means is not in functionally actuated condition, the current flow induced by said second named current source will be only sufficient to assure effective energization of said second named relay; interconnections between the respective current sources and relays of said circuits whereby deenergization of said relays will effect parallel connection of said sources for the supply of said circuits; and a warning device so associated with said interconnections that the energy of one of said sources will be applied to said device whenever the relay associated with the other of said sources becomes deenergized.

4. A signal system comprising repeating mechanism including circuit controlling means and electromagnet mechanism unresponsive to current flow of less than a certain predetermined intensity and arranged to cause functional actuation of said controlling means in response to current flow of greater intensity; a transmitting circuit including said electromagnetic mechanism, a current source, a relay having two contacts and arranged for effective energization in response to current flow in said circuit of less than the aforesaid predetermined intensity, and transmitting stations arranged to formulate signaling impulses in said circuit by abnormal conditioning thereof to terminate effective energization of said relay, said circuit of such resistance and so arranged that the current flow normally induced by said current source will be only sufficient to assure effective energization of said relay and so that the current flow during the aforesaid abnormal conditioning of said circuit will cause functional actuation of the controlling means of said repeating mechanism; a receiving circuit including a current source, receiving devices unresponsive to current flow of less than a certain predetermined intensity and arranged for functional actuation in response to current flow in said receiving circuit of greater intensity, a relay having two contacts and arranged for effective energization in response to current flow in said receiving circuit of less intensity than that required for the functional actuation of said receiving devices, said receiving circuit so connected to the circuit controlling means of said repeating mechanism and of such resistance and so arranged that, when said circuit controlling means is in functionally actuated condition, said second named relay will not be effectively energized and the intensity of the current flow through said receiving devices will be sufficient to cause response thereof, and, when said circuit controlling means is not in functionally actuated condition, the current flow induced by said second named current source will be only sufficient to assure effective energization of said second named relay; a warning device; interconnections between said current sources, said relays and said warning device whereby one terminal of said warning device is connected to one of the contacts of each of said relays and the other terminal of said warning device is connected to one of the terminals of each of said current sources and the remaining terminal of the first named current source is connected with the remaining contact of the second named relay, and vice versa, respectively, whereby deenergization of said relays will effect parallel connection of said sources for the supply of said circuits.

5. A signal system comprising repeating mechanism including circuit controlling means and electromagnetic mechanism unresponsive to current flow of less than a certain predetermined intensity and arranged to cause functional actuation of said controlling means in response to current flow of greater intensity; a transmitting circuit including said electromagnetic mechanism, a current source, a relay having two contacts and arranged for effective energization in response to current flow in said circuit of less than the aforesaid predetermined intensity, and transmitting stations arranged to formulate signaling impulses in said circuit by abnormal conditioning thereof to terminate effective energization of said relay, said circuit of such resistance so arranged that the current flow normally induced by said current source will be only sufficient to assure effective energization of said relay and so that the current flow during the aforesaid abnormal conditioning of said circuit will cause functional actuation of the controlling means of said repeating mechanism; a receiving circuit including a current source the electromotive force of which is substantially equivalent to that of said first named current source, receiving devices unresponsive to current flow of less than a certain predetermined intensity and arranged for functional actuation in response to current flow in said receiving circuit of greater intensity, a relay having two contacts and arranged for effective energization in response to current flow in said receiving circuit of less intensity than that required for the functional actuation of said receiving devices, said receiving circuit so connected to the circuit controlling means of said repeating mechanism and of such resistance and so arranged that, when said circuit controlling means is in functionally actuated condition, said second named relay will not be effectively energized and the intensity of the current flow through said receiving devices will be sufficient to cause response thereof, and, when said circuit controlling means is not in functionally actuated condition, the current flow induced by said second named current source will be only sufficient to assure effective energization of said second named relay; a warning device; interconnections between said current sources, said relays and said warning device whereby one terminal of said warning device is connected to one of the contacts of each of said relays and the other terminal of said warning device is connected to one of the terminals of each of said current sources and the remaining terminal of the first named current source is connected with the remaining contact of the second named relay, and vice versa, respectively, whereby deenergization of said relays will effect parallel connection of said sources for the supply of said circuits.

In witness whereof, I hereunto subscribe my name, this 5th day of January, 1920.

CLARENCE E. BEACH.